Nov. 11, 1930.  J. J. DERFUS  1,781,373

CURD WORKING MACHINE

Filed March 26, 1930   2 Sheets-Sheet 1

Nov. 11, 1930.   J. J. DERFUS   1,781,373
CURD WORKING MACHINE
Filed March 26, 1930   2 Sheets-Sheet 2

Inventor
J. J. Derfus
by
Attorneys

Patented Nov. 11, 1930

1,781,373

UNITED STATES PATENT OFFICE

JOHN J. DERFUS, OF APPLETON, WISCONSIN

CURD-WORKING MACHINE

Application filed March 26, 1930. Serial No. 439,104.

This invention relates to a curd working machine.

Heretofore, in the manufacture of cheese, it has been common practice to first manually cut the curd within the vat and thereafter deliver or shovel the same into a conventional curd mill, generally placed upon the top of the vat for convenience. As the curd is passed through the mill, the same is discharged back into the vat, where it is manually mixed, generally by forks, which requires hard, tedious labor, and even though this operation is performed by a careful and highly skilled cheese maker, crushing or breaking up of the curd cannot be avoided.

The present invention has for its object to overcome the foregoing difficulties and objections by the provision of a comparatively simple, economical, and efficient portable machine, which is power-actuated, and adapted to be guided along the bottom of a vat through the curd contained therein, to either cut or mix the same, thus eliminating manual handling or working of the curd.

Incidental to the foregoing, a more specific object of the present invention is to provide a machine of the general character set forth, comprising a power driven cutter or mixer carried by a suitable frame serving as runners to allow the same to be drawn along the bottom of a curd vat, and provided with means for assisting propelling of the machine through the curd, and at the same time feeding the curd to either the cutter or mixer with which the machine happens to be equipped.

A further object resides in the provision of floating driven means adapted for engagement with the curd to assist in propelling the machine and feeding the curd to the cutter or mixer, whereby said means is self-adjusting to varying depths of curd.

A still further object of the invention resides in the provision of a machine of the foregoing character in which a driven toothed drum is floatingly mounted before the cutter or mixer blades to engage the curd and assist in the propulsion of the machine, as well as feeding the curd over an elevating plate to the cutter or mixer.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is an elevation of a machine constructed in accordance with the present invention, with the gear casings cut away and in section to illustrate the driving mechanism;

Referring now more particularly to the accompanying drawings, the numeral 1 designates a frame comprising a pair of side members 2 connected at the top by a head-piece 3 which serves to support a conventional electric motor 4 adapted to operate the mechanism as hereinafter described. The lower edges of the side members 2 are preferably flat and serve as runners upon which the machine is slid over the bottom of the ordinary cheese vat.

Figure 3:
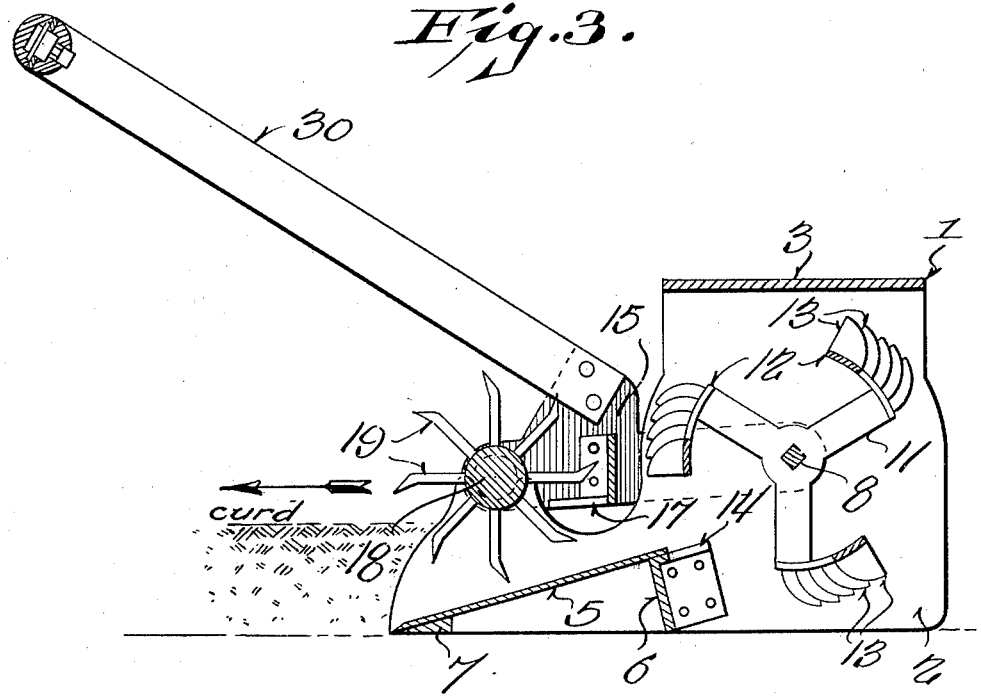
Figure 3 is a longitudinal section taken on the line 3—3 of Figure 2.
Figure 4:
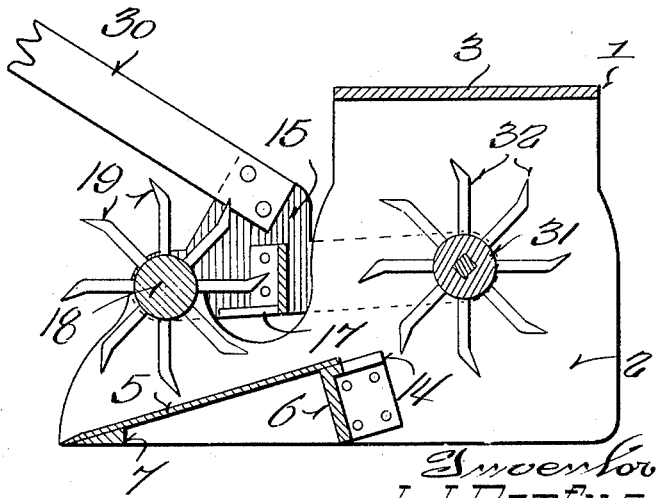
Figure 4 is a similar section illustrating a mixer substituted for the cutter.

Mounted between the side members 2 is an inclined scraper and elevating plate 5 which extends from the forward lower edge of the side members and is supported at its rear edge upon a cross frame 6 and the side frames 2. The forward edge of the elevating plate 5 may be reenforced and supported upon a cross member 7. Obviously, as the frame is drawn along the bottom of a vat in the direction indicated by the arrow in Figure 3, the curd will be picked up by the scraper blade 5 and directed rearwardly to be cut or mixed, as will be hereinafter described.

Removably carried by the side members 2 is a squared shaft 8, one end of which is journalled in the hub extension 9, while the opposite end is received within the hub 10, which in turn is journalled in one of the side members 2.

During the cutting operation of the curd, a cutter head 11 is mounted upon the squared shaft and rotated therewith. The cutter comprises a plurality of longitudinal spiral blades 12, each provided with spaced radial fins 13 which, in cooperation with the blades 12, serve to cut the curd in small squares or cubes, as the same is fed to the rear of the elevating plate 5. Here, it will be noted that the cross member 6, which supports the rear end of the elevating plate 5, is provided with laterally projecting comb teeth 14 which mesh with the radial fins 13 and clear the curd from between the same, as the cutter is rotated.

Pivotally carried by the side frames 2 are a pair of floating arms 15 and 16, respectively, the arm 15 being journalled upon the hub extension 9, while the arm 16 is mounted upon the hub 10, which receives one end of the squared shaft 8. The arms 15 and 16 are connected by a transverse cone bar 17, and journalled in their outer ends is a drum 18 provided with spaced sets of teeth 19, preferably staggered longitudinally with relation to each other. Thus, it will be seen that the toothed drum 18 is free to float about the axis of the shaft 8 and, therefore, as the machine is propelled along the bottom of the vat the drum will readily adjust itself to varying heights of curd.

The drive for the cutter is obtained through a train of gears connecting the motor and hub 10, in which the shaft 8 is splined, the hub 10 being provided with an integral gear 20, meshing with a set of intermediate idler gears 21, which in turn engage the pinion 22 carried by the motor shaft.

Thus, it will be seen that any desired reduction may be obtained between the driving motor and cutter shaft, and while a train of reduction gearing has been illustrated and described, it will be understood that various drives, such as link chain or bevel gearing, may be employed without affecting the principle of operation.

Figure 1:
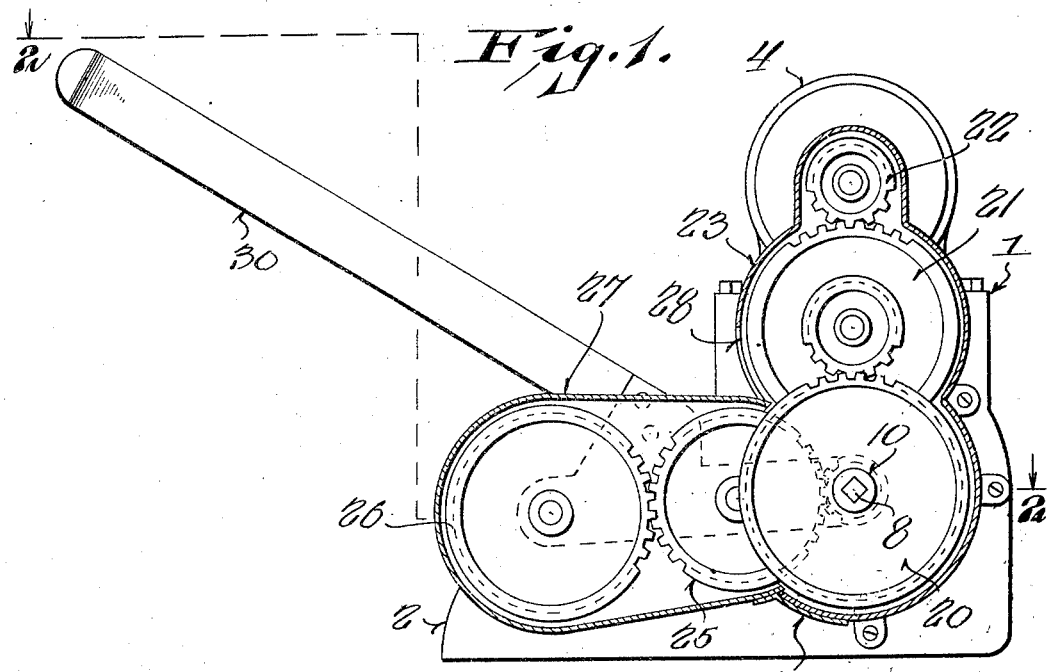
Figure 2:
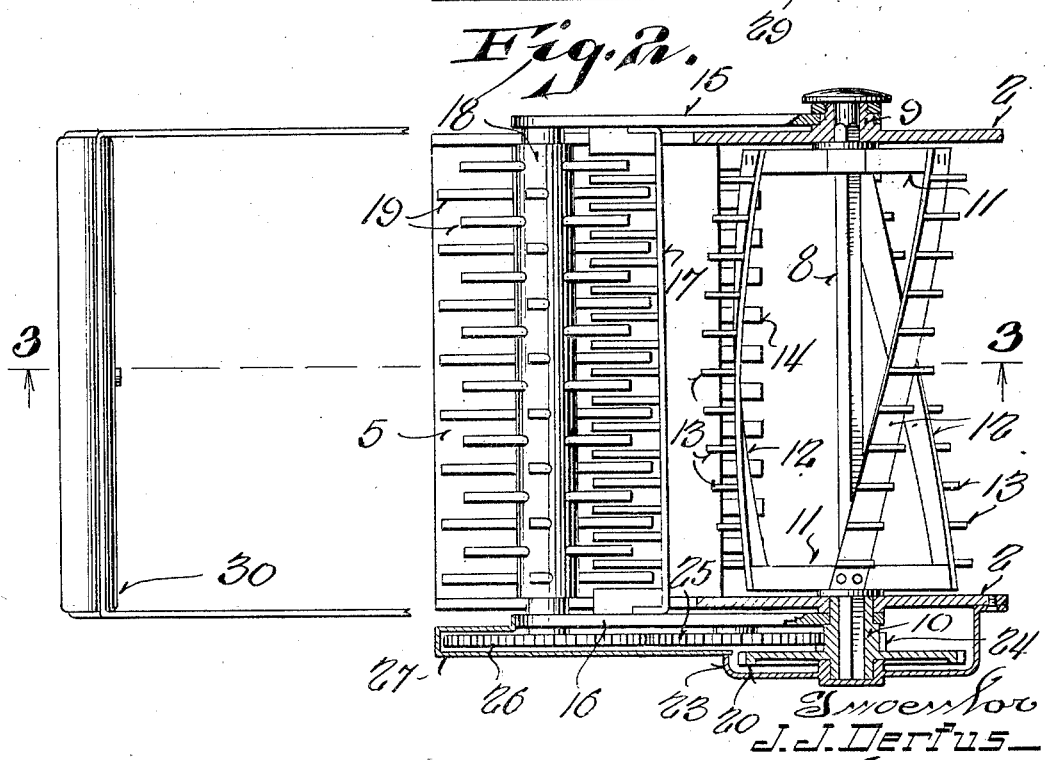
Figure 2 is a plan section taken on the line 2—2 of Figure 1.

To prevent the transmission gearing from coming into contact with the curd within the vat, the same is housed in a suitable gear casing 23 carried by one of the side frames 2. As shown in Figure 2, it will be noted that the outer end of the hub 10 is journalled within the casing, thus providing a two-point bearing for the hub to take up accompanying strain and reduce wear.

The drive for the toothed drum 18 is taken off the hub 10, which, in addition to the gear 20, is provided with pinion teeth 24 which engage an idler gear 25 carried by the arm 16, and meshing with the gear 26 mounted upon one end of the toothed drum 18. Thus, as the drum oscillates vertically about the axis of the shaft 8, the driving connection is maintained, and both the drum and cutter are rotated in the same direction.

A suitable gear casing 27 is carried by the arm 16 and houses the gears 25 and 26, thus preventing their contact with the curd. In this connection, it will be noted that the rear end of the casing 27 projects through a confined opening 28 formed in the front of the casing 23, while the lower portion of the casing 27 carries a lip 29 which engages the outer periphery of the casing 23, and thus as the casing 27 is oscillated about the axis of the shaft 8, the lower portion of the slot 28 remains covered by the lip 29 and prevents curd from entering the casing 23. While a small portion of the slot 28 above the casing 27 is exposed, it will be understood that the depth of the curd within the vat does not ordinarily extend above the plane of the shaft 8. Therefore, it is unnecessary to provide a closure for this exposed portion of the slot.

In operation, the present machine is placed in a vat, containing curd, closely adjacent one side of the vat. Power is then transmitted to the cutter and to the drum by means of the motor 4 and the transmission gearing heretofore described. Obviously, the toothed drum will rest upon the top of the heavy curd, in that the same is free to float about the axis of the shaft 8. As the drum 18 is rotated, the teeth 19 will engage the curd and tend to draw the machine forwardly in the direction indicated by the arrow in Figure 3, at the same time serving to feed the curd over the elevating plate 5 to the cutter 11, which, as described, serves to cut the curd in small cubes and leaves the same evenly distributed over the bottom of the vat, as the machine travels through the curd.

The cone 17, meshing with the teeth 19 of the feeding drum, will readily strip the curd from the teeth as the drum is rotated, thus preventing clogging, and insuring both proper feeding and propelling action by the drum. While the drum 18 has a tendency to propel the machine forwardly through the curd, such action is not entirely relied upon, as a yoke handle 30 is provided, which is preferably connected to the floating arms 15 and 16, as illustrated, and it will be quite apparent that a slight draw upon the handle will enable an operator to control the speed of travel of the machine through the curd, as well as to guide the machine.

While the present machine may be made in any width, in actual practice it has been found that more efficient operation and better manipulation is obtained from a narrow machine, as the same may then be readily drawn the length of the vat and thereafter turned and drawn in the opposite direction to cover the entire area of the vat.

When the cutting operation has been completed, and it is desired to mix the curd, the squared shaft 8 is withdrawn, which permits removal of the cutter head 11, and substitution of a mixer 31, which comprises a drum provided with any type of suitable mixing fins or blades 32, which engage and mix the cubes of curd as the machine is again drawn through the contents of the vat.

From the foregoing explanation, taken in connection with the drawings, it will be seen that a comparatively simple, inexpensive, and efficient machine has been devised for eliminating the hard and tedious operation of cutting curd and thereafter mixing the same during the process of making cheese.

It will also be appreciated that no manual handling or working of the cheese is required, which insures uniform cutting and mixing, and reduces to a minimum the crushing or breaking up of the curd, which is an objection frequently encountered, where either manual or driven rakes or agitators are used for the mixing operation.

It will further be seen that the machine, because of its comparatively light weight construction, is readily portable and easily manipulated during operation, in that its propulsion through the curd is assisted by the power driven toothed drum, which also elevates and feeds the curd to the cutter or mixer.

I claim:

1. A curd working machine comprising a portable frame for support upon the bottom of a cheese vat, means for manually guiding and propelling the frame along the bottom of the vat, a motor driven cutter or mixer carried by said frame, and driven means for engaging the curd to assist in propelling the machine through the curd and feeding the same to the cutter or mixer.

2. A curd working machine comprising a portable frame for support upon the bottom of a cheese vat, means for manually guiding and propelling the frame along the bottom of the vat, a motor driven mixer or cutter carried by said frame, and driven means for engaging the curd ahead of the cutter to assist in propelling the machine through the curd and feeding the curd to the cutter or mixer.

3. A curd working machine comprising a portable frame for support upon the bottom of a cheese vat, means for manually guiding and propelling the frame along the bottom of the vat, a motor driven cutter or mixer carried by said frame, and floating driven means for engaging the curd to feed the same to the cutter or mixer.

4. A curd working machine comprising a portable frame for support upon the bottom of a cheese vat, means for manually guiding and propelling the frame along the bottom of the vat, a motor driven cutter or mixer carried by said frame, an inclined plate for directing curd to the cutter, and driven means positioned above the inclined plate for feeding the curd to the cutter and mixer.

5. A curd working machine comprising a portable frame for support upon the bottom of a cheese vat, means for manually guiding and propelling a frame along the bottom of the vat, a motor driven cutter or mixer carried by said frame, an inclined plate for directing curd to the cutter or mixer, and floating driven means positioned above said inclined plate for feeding curd to the cutter mixer.

6. A curd working machine comprising a portable frame for support upon the bottom of a cheese vat, means for manually guiding and propelling a frame along the bottom of the vat, a motor driven cutter or mixer carried by said frame, an inclined plate for directing curd to the cutter or mixer, and a floating toothed drum positioned above said inclined plate for feeding curd to said cutter or mixer.

7. A curd working machine comprising a portable frame for support upon the bottom of a cheese vat, means for manually guiding and propelling a frame along the bottom of the vat, a motor driven cutter or mixer carried by said frame, an inclined plate for directing curd to the cutter or mixer, and a floating driven toothed drum mounted above said plate for feeding curd to said cutter or mixer.

8. A curd working machine comprising a portable frame for support upon the bottom of a cheese vat, means for manually guiding and propelling a frame along the bottom of the vat, a driven shaft movably carried by said frame for receiving a cutter or mixer, means carried by said frame for driving said shaft, means for elevating and directing curd to said cutter or mixer, and driven means for feeding curd to said cutter or mixer.

9. A curd working machine comprising a portable frame for support upon the bottom of a cheese vat, a cutter or mixer carried by said frame, means for elevating and directing curd to said cutter or mixer, a pivotal frame carried by said main frame, driven means carried by said pivotal frame for feeding curd to said cutter mixer, and means for manually guiding and propelling the machine along the bottom of a vat.

10. A curd working machine comprising a portable frame for support upon the bottom of a cheese vat, means for manually guiding and propelling said frame along the bottom of a vat, a motor driven cutter having longitudinal and radial blades, an inclined plate for elevating and directing curd to said cutter blades, means for stripping said cutter blades, a driven toothed drum shiftably mounted upon said elevating plate, and means for stripping the teeth of said drum.

11. A curd working machine comprising a portable frame for support upon the bottom of a cheese vat, means for manually guiding and propelling the frame along the bottom of the vat, a cutter or mixer carried by said frame and provided with radial fins, means for stripping said fins, an inclined plate for elevating and directing curd to said cutter or mixer, a pair of spaced arms pivotally mounted upon said frame, a driven toothed drum carried by said arms and positioned above said inclined plate, and means carried by said arms for cleaning the teeth of said drum.

12. A curd working machine comprising an arch-shaped frame, the sides of which serve as runners to engage the bottom of a cheese vat, a cutter or mixer mounted between the side portions of said frame, an inclined plate for elevating and directing curd to the mixer or cutter, a pair of arms pivotally mounted upon the sides of said frame, a toothed drum journalled in the free end of said arms, a motor mounted upon the top of said frame, driving connections between said motor, said cutter and said toothed drum, and a handle for manually guiding and propelling the frame along the bottom of the vat.

In testimony that I claim the foregoing I have hereunto set my hand at Appleton, in the county of Outagamie and State of Wisconsin.

JOHN J. DERFUS.